UNITED STATES PATENT OFFICE.

WILLIAM T. GREEN, OF SUMMIT, NEW JERSEY.

DENTIFRICE.

1,386,252. Specification of Letters Patent. Patented Aug. 2, 1921.

No Drawing. Application filed May 17, 1920. Serial No. 382,143.

*To all whom it may concern:*

Be it known that I, WILLIAM T. GREEN, a citizen of the United States, residing at Summit, in the county of Union and State of New Jersey, have invented certain new and useful Improvements in Dentifrices; and I do declare the following to be a full, clear, and exact description of the invention, such as will enable others skilled in the art to which it appertains to make and use the same.

The present invention relates to a dentifrice which is adapted to remove from the teeth and gums all traces of food products, mucin and other materials which lead to the decay of the teeth. It is already well recognized that bacterial growth in and around the teeth, and the formation of mucin, tartar and the like are the primary causes of teeth decay and of pyorrhea aveolaris. My investigations have demonstrated that it is easy to combat these agencies by the employment of a dentifrice composed essentially of saccharomyces cerevisiæ, and precipitated calcium phosphate and in order to make the preparation more active, it is advisable to add other materials as mentioned below, although some of these ingredients can be omitted if desired. Besides the yeast and calcium phosphate, a small quantity of pancreatin, diastase, and phosphoric acid also directly aid in the removal of mucin, tartar and the like and also in the destruction of the harmful bacteria.

Accordingly, the solid portion of the dentifrice is preferably made up of the following materials in the proportions stated:

| | |
|---|---|
| Saccharomyces cerevisiæ | 150 parts. |
| Calcium phosphate precipitated | 300 " |
| Saccharin | 1.3 " |
| Powdered ginger | 20 " |
| Alcohol 95% | 40 " |
| Pancreatin | 4 " |
| Diastase | 4 " |
| Phosphoric acid, 85% | 4 " |
| Oil of peppermint | 1.3 " |

These materials are preferably mixed together in a relatively dry condition (that is to say, the yeast is first separated from water by filtration, centrifugation or the like) and the mixture is then dried at room temperature to produce a dry powder containing the ingredients.

If it is desired to use the material in the form of a tooth paste, a sufficient amount of glycerin may be added to produce the desired consistency. The material is used according to the ordinary method of applying a dentifrice.

The yeast is found to act directly on nearly all kinds of bacteria, and also the yeast has the effect of growing more rapidly and consuming the materials present upon which the said bacteria must depend for their nutriment and moreover the yeast produces compounds which are found to be inhibitory to the propagation of bacteria. The yeast and also the pancreatin and diastase have the effect of breaking up and destroying the mucin and carbohydrates present, and these also remove the albuminous materials upon which the bacteria would have to depend for their nutriment, hence the bacteria cannot survive and multiply. The precipitated calcium phosphate acts as an abrasive or detergent agent to assist in cleaning and cleansing the teeth and the spaces between the teeth. The powdered ginger increases the flow of alkaline saliva and increases the blood supply to the parts, in addition to giving a pleasant flavor to the dentrifrice. The alcohol acts as a preservative. The pancreatin consists of three ferments or enzyms, amylopsin, trypsin and steapsin. This material, accordingly, acts to split the albuminoid products and the carbohydrates, and also emulsifies and saponifies fats present, thereby assisting in the solution of the same and hastening the removal thereof from the teeth and gums and spaces between the teeth. The diastase possesses an amylolytic function and accordingly aids the pancreatin. The phosphoric acid present unites with some of the precipitated phosphate to form acid phosphate which acts as a stimulant for the yeast. The oil of peppermint is employed as a flavoring agent. If the glycerin is used it acts as a preservative and also possesses hygroscopic properties which are useful.

I claim:

1. A dentifrice comprising yeast and an abrasive agent.

2. A dentifrice comprising yeast and other proteolytic or amylolytic enzym material and an abrasive agent.

3. A dentifrice comprising yeast, precipitated calcium phosphate, saccharin, powdered ginger, alcohol, pancreatin, diastase, phosphoric acid and a flavoring agent.

4. A dentifrice comprising yeast, pancreatin and diastase.

5. A dentifrice comprising yeast and calcium phosphate.

6. In the process which comprises scouring human teeth with a dentifrice for cleaning the same, the step of scouring with a composition comprising yeast.

In testimony whereof I have hereunto set my hand.

WILLIAM T. GREEN.